United States Patent [19]

Whitlow

[11] 4,337,832
[45] Jul. 6, 1982

[54] LIFT SYSTEM, STEERING SYSTEM, AND PIVOTAL BLADE FOR LAND PLANE

[76] Inventor: Jerry Whitlow, Rte. 7, Box 393A, Paragould, Ark. 72450

[21] Appl. No.: 163,565

[22] Filed: Jun. 27, 1980

[51] Int. Cl.³ .................... A01B 61/04; A01B 69/08; E02F 3/76
[52] U.S. Cl. ..................................... 172/265; 60/584; 172/282; 172/316; 172/780; 172/794; 180/132
[58] Field of Search ............... 172/4.5, 264, 265, 282, 172/285, 286, 288, 289, 315, 316, 326, 328, 396, 400, 500, 705, 780, 794, 799, 816; 180/132; 280/442, 443, 444, 445; 60/584, 592; 37/42 VL

[56] References Cited

U.S. PATENT DOCUMENTS

| | | | |
|---|---|---|---|
| 2,310,057 | 2/1943 | Boerma | 172/795 |
| 2,646,850 | 7/1953 | Brown | 280/468 |
| 2,669,096 | 2/1954 | MacDuff | 60/584 X |
| 3,022,587 | 2/1962 | Greeley | 172/790 |
| 3,081,567 | 3/1963 | Saul | 172/799 |
| 3,212,793 | 10/1965 | Pietroroia | 280/443 |
| 3,227,238 | 1/1966 | Strader | 180/140 |
| 3,305,041 | 2/1967 | Schramm | 180/140 |
| 3,452,827 | 7/1969 | Reynolds | 172/264 |
| 3,481,407 | 12/1969 | Arnold et al. | 172/285 |
| 3,800,884 | 4/1974 | Estes | 172/780 |
| 3,893,518 | 7/1975 | Farrell | 172/794 |
| 3,910,353 | 10/1975 | Ralston | 172/1 |
| 4,150,726 | 4/1979 | Weitlow | 172/780 |

FOREIGN PATENT DOCUMENTS 1203598 8/1959 France .
1303042 7/1962 France .
242540 9/1969 U.S.S.R. .............. 172/4.5

*Primary Examiner*—Richard T. Stouffer
*Attorney, Agent, or Firm*—Bacon & Thomas

[57] ABSTRACT

A land plane for leveling or grading the surface of a land area. The plane includes a frame defined by a center section and end sections pivotally connected to the center section, with each connection permitting relative physical movement about an axis transverse to the longitudinal axis of the plane. A first hydraulic system is provided for pivoting the end sections about their transverse axes for raising and lowering the center section with respect to ground level, wherein the system includes a device for equalizing fluid between hydraulic cylinders carried by the end sections to permit adjustment of the grader assembly with respect to ground level under different operating conditions. A second hydraulic system is provided to permit selective steering of the rear wheels in response to the front wheels through either pivotal movement of a tongue connecting the plane to a tow vehicle or from a separate hydraulic power source carried by the tow vehicle, wherein the system includes means for purging itself of entrapped air. A biasing mechanism is provided for the grader assembly to permit tripping of the blades when the applied force encountered during grading exceeds the predetermined bias force. The mechanism is capable of imparting a bias force which requires a greater degree of applied force to initiate tripping of the blade than that which is required for continued tripping of the blade.

16 Claims, 6 Drawing Figures

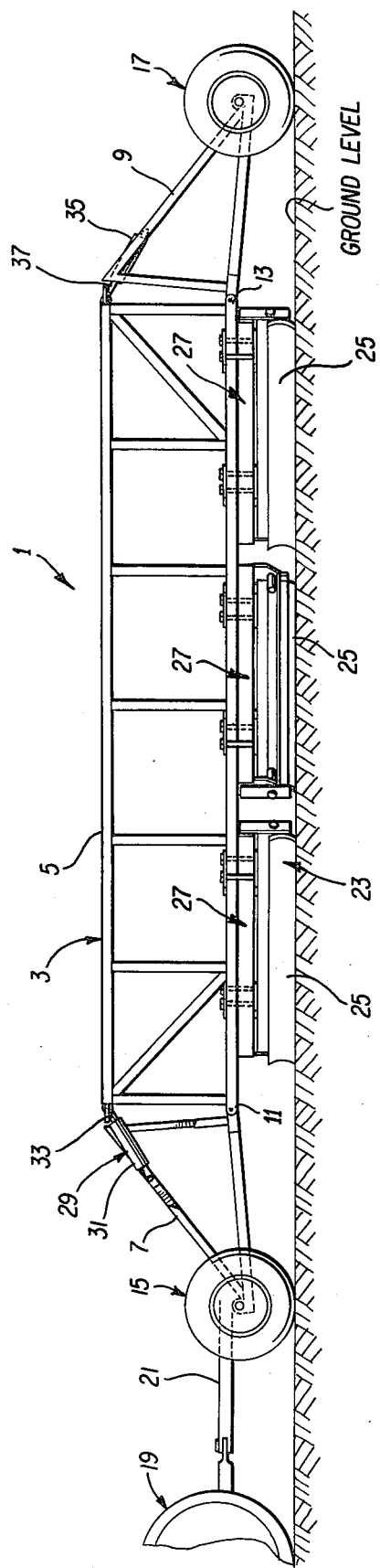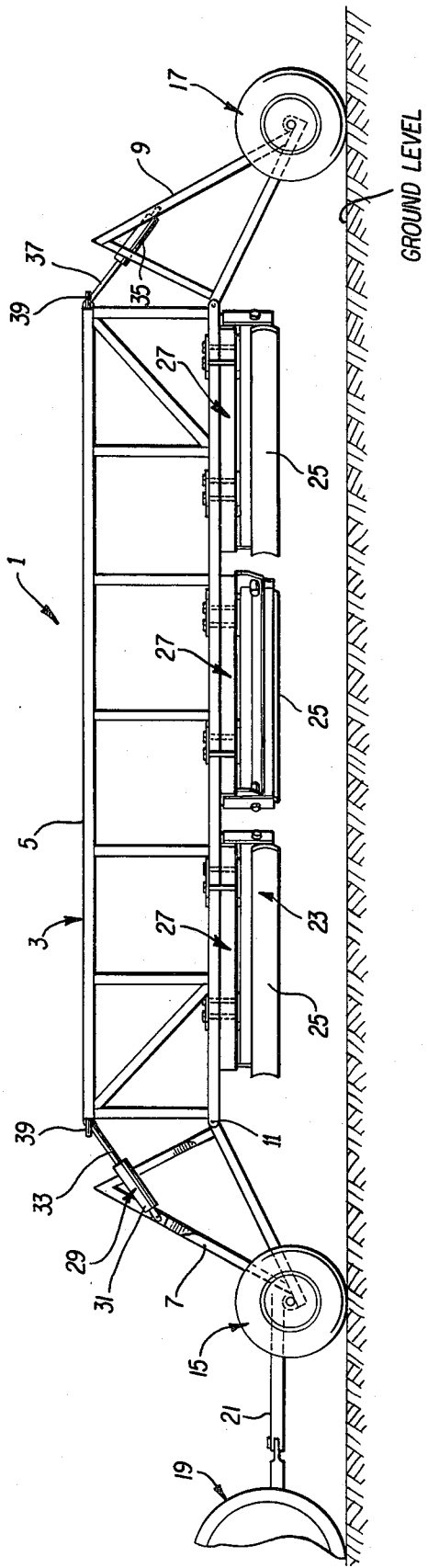

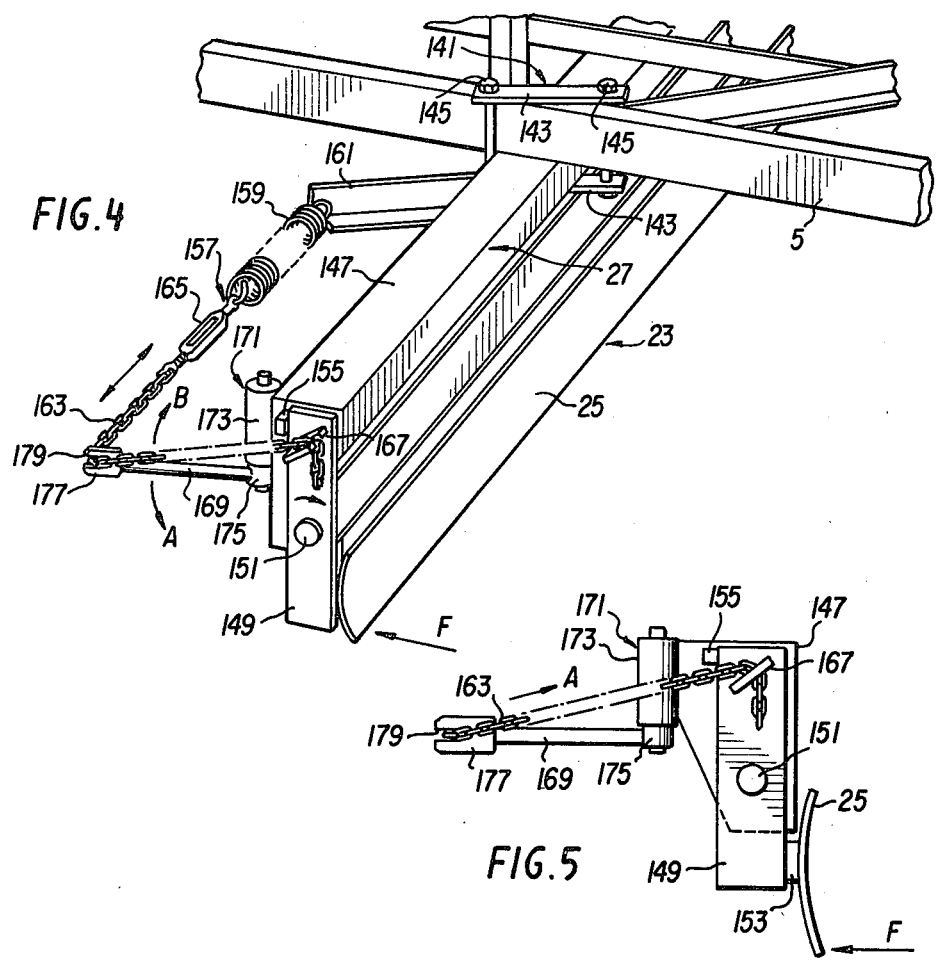
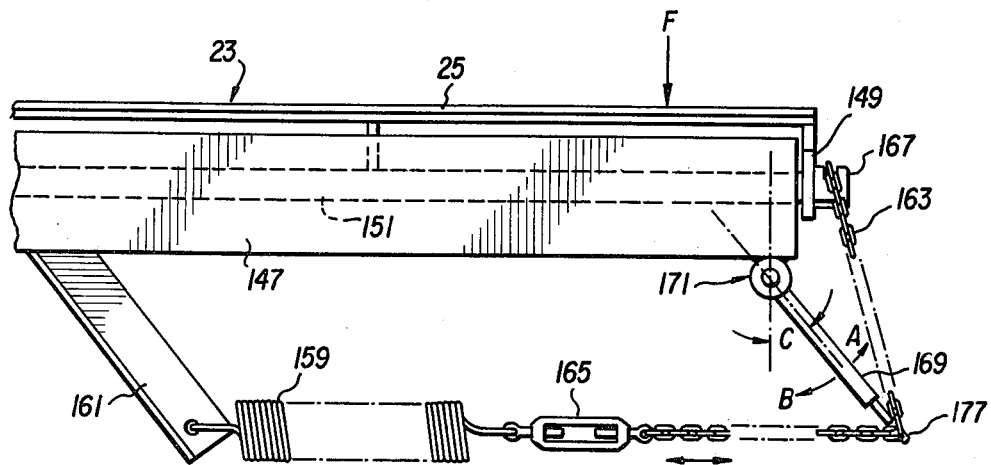

LIFT SYSTEM, STEERING SYSTEM, AND PIVOTAL BLADE FOR LAND PLANE

BACKGROUND OF THE INVENTION

1. Field of the Invention

The present invention generally involves apparatus utilized for altering, shaping or grading the surface of ground areas. More particularly, the invention relates to land planes having trippable grader blades and hydraulic systems for steering the plane and raising and lowering the center frame section.

2. Description of the Prior Art

A land plane is a large vehicular device comprised of a wheel supported frame structure which carries one or more grader blades for contacting the ground surface when the plane is towed by a tractor or other suitable tow vehicle. A typical land plane may include a truss-like frame comprised of three distinct sections, a center section and two end sections which are pivotally connected at opposite ends of the center section in such a manner that the end sections may pivot about axes transverse to the longitudinal axis of the plane. This enables the center section, which carries the grader assembly, to be raised and lowered with respect to the ground surface. Pivoting of the end sections with respect to the center section for the purpose of raising and lowering the latter has typically been achieved by using an hydraulic cylinder carried by one end section and operatively connected to the other end section through a cable or rod linkage. While this arrangement is quite suitable for simply raising the center section a considerable distance above ground level in order to accommodate towing the plane to its location of use, it does not easily accommodate precise adjustment of distance between the grader blade edges and ground surface when the plane is set for operation. This is because the frame is usually provided with stops in the form of extensible bolts or similar devices on the center section to adjust for the maximum downward movement of the center section when hydraulic fluid is removed from the lift cylinder. In some instances, it is desirable to dispose the series of grader blades at different distances with respect to the ground surface in order to prevent excess accumulation of soil at the leading blade. Precise adjustment in this regard requires independent control over the pivotal movements of the individual end sections in order to permit corresponding independent adjustment of the stops.

Because of its large wheel base, a land plane requires independent steering of the front and rear wheel assemblies so that steering of the front wheel assembly produces a corresponding though oppositely directed steering action in the rear wheel assembly to accommodate its large turning radius. This has been accomplished by interconnecting the front and rear wheel assemblies through mechanical or hydraulic steering systems. In a typical hydraulic system, an hydraulic cylinder is carried by the front wheel assembly, with the piston rod being actuated by the pivotal movement of a tongue connecting the plane to the tow vehicle. The front cylinder is in fluid communication with a similar cylinder carried by the rear wheel assembly so that steering of the front wheels imparts the corresponding and opposite steering action to the rear wheels. Such a system is also capable of being connected to a separate hydraulic power source, such as that usually associated with the tow vehicle, so that the rear wheels may be selectively steered either through the action of the front cylinder or through the hydraulic power supplied by the tow vehicle. Hydraulic steering systems of this type are normally plagued by entrapment of air in the fluid system. It has been determined that even a small amount of air can cause undesirable variations in steering actions between the front and rear wheel assemblies. Such variations are multiplied manifold in their detrimental effects because of the large turning radius of a land plane.

The grader assembly carried by a typical land plane consists of several blades which are disposed at varying angles to the longitudinal axis of the plane so that the most efficient ground contact can be realized. The blades are usually pivotally mounted so that they can trip rearwardly when obstructions are encountered during grading to prevent damage to the blades. This has been achieved by resiliently biasing the blades with springs or similar appliances so that tripping of the blades will occur when the bias force is exceeded by the force applied to the blades. The bias force is adjustable to compensate for different ground conditions. However, it has been proven difficult to apply a biasing force of such a nature that continuous tripping of the blades during normal operation is avoided while still affording complete protection against damage to the blades.

SUMMARY OF THE INVENTION

It is an object of the present invention to provide an improved land plane having an hydraulic lift assembly which permits precise adjustment of the grader assembly blades with respect to the ground surface.

It is another object of the invention to provide an improved hydraulic steering system for a land plane wherein entrapped air in the fluid lines is easily and quickly purged from the system to permit accurate control over the steering of the plane.

It is yet another object of the invention to provide an improved biasing mechanism for the grader assembly of a land plane whereby continuous tripping of the individual blades will be avoided while affording complete protection for the blades against mechanical damage.

It is a further object of the invention to provide an improved land plane which is reliable and simple in both construction and operation.

It is also another object of the invention to provide an improved land plane which is relatively inexpensive to manufacture and maintain, and is capable of performing under all anticipated conditions.

These above objects are realized by providing a land plane with a first hydraulic system for raising and lowering the center section of the frame through pivotal movement of the end sections connected thereto. The first hydraulic system includes a fluid cylinder carried by the front end section and a similar fluid cylinder carried by the rear end section, with both cylinders being in fluid communication with each other and a separate power source, such as the hydraulic power supplied by a tractor. A means for bypassing the hydraulic fluid from the power source directly to the rear cylinder is provided so that fluid pressure between the cylinders can be equalized to permit adjustment of the distance between the grader blades and ground surface. A second hydraulic system is provided for steering the plane wherein a rear hydraulic cylinder steers the rear wheels in accordance with fluid pressure transmitted thereto from a front hydraulic cylinder which is actuated by the pivotal movement of a tongue connecting the plane to a tow vehicle. The rear cylinder may also be selectively and independently actuated from a separate hydraulic power supply carried by the tow vehicle under certain operating conditions. A bypass is provided in the second hydraulic system to permit purging of air entrapped therein, whereby the purged air is passed out of the system and into the hydraulic fluid reservoir on the tow vehicle. The plane further includes a grader assembly wherein each of the blades is provided with a biasing mechanism having a cam arm and associated linkage for presetting the degree of bias force imparted by a spring or similar resilient element so that a greater applied force is necessary to initiate tripping than that which is required to complete tripping of the blade.

These and other objects and advantages of the present invention will become apparent as the invention is more fully hereinafter described and claimed, with reference being made to the accompanying drawings forming a part hereof, wherein like numerals refer to like parts throughout, and in which:

BRIEF DESCRIPTION OF THE DRAWINGS

FIG. 1 is a side elevational view of the land plane of the present invention depicting the blades of the grader assembly in their lowered operative position;

FIG. 2 is a view, similar to FIG. 1, wherein the center section of the frame and associated grader assembly are depicted in a raised inoperative position for travel purposes;

FIG. 4 is a fragmentary perspective view depicting a single blade of the grader assembly and its associated biasing mechanism;

FIG. 5 is an end elevational view of the blade of FIG. 4; and

FIG. 6 is a fragmentary plan view of the blade of FIG. 4.

DETAILED DESCRIPTION OF THE PREFERRED EMBODIMENTS

Figure 3:
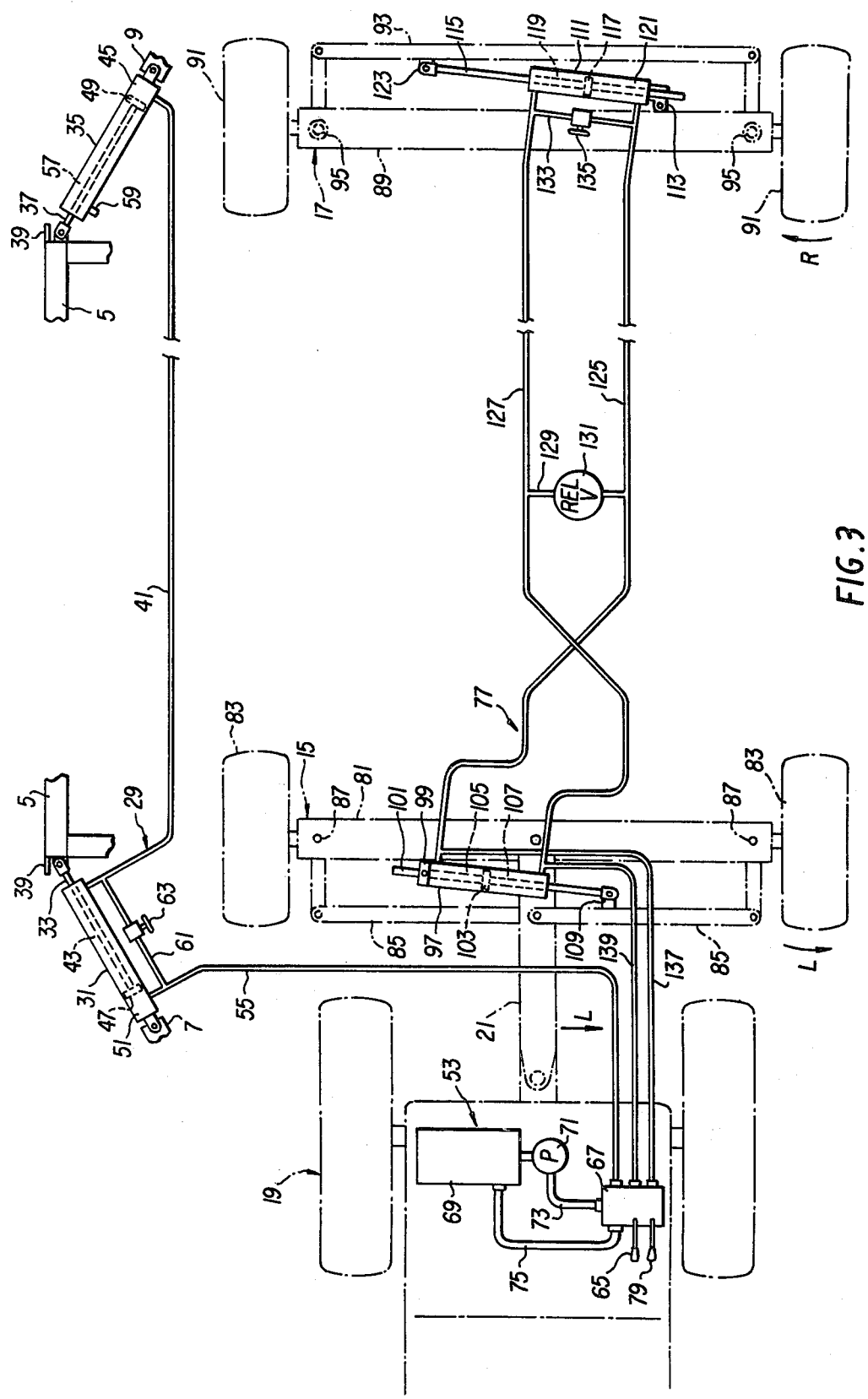
FIG. 3 is a schematic diagram depicting the first hydraulic system for raising and lowering the center section of the frame and the second hydraulic system for steering the land plane.

A land plane 1 or similar such device with which the present invention is suitable for association is depicted in FIG. 1. Land plane 1 is generally defined by a large truss-type frame 3 which includes a center section 5, a front end section 7 and a rear end section 9. End section 7 is connected to center section 5 through a front pivot connection 11 while end section 9 is similarly connected to center section 5 through a pivot connection 13. Connections 11 and 13 permit end sections 7 and 9 to each pivot relative to center section 5 about an axis that is transverse to the longitudinal axis of frame 3. A front wheel assembly 15 is carried by end section 7 and a rear assembly 17 is carried by end section 9, with wheel sections 15 and 17 supporting frame 3 for travel when plane 1 is towed by a tow vehicle, shown generally at 19, such as a tractor or the like. A pivotal tongue 21 is carried by front wheel assembly 15 for connecting plane 1 to tow vehicle 19.

Center section 5 carries a grader assembly 23 which includes one or more grader blades 25, each of which is connected to center section 5 through a blade support, indicated generally at 27. Each support 27 permits disposition of the longitudinal axis of its associated blade at the desired angle with respect to the longitudinal axis of frame 3. Variations in the angular dispositions of blades 25 is desirable for accommodating various ground conditions and maximizing grading efficiency.

As also shown in FIG. 1, frame 3 includes a first hydraulic system 29 that includes a front fluid motor in the form of a lift cylinder 31 carried by end section 7. Cylinder 31 is provided with an extensible piston rod 33 having an outer end that contacts and may by pivotally connected to center section 5. Similarly, end section 9 is provided with a rear fluid motor in the form of a lift cylinder 35 that includes an extensible rod 37 having an outer end contacting or pivotally connected to center section 5.

As depicted in FIG. 2, lift cylinders 31 and 35 have been actuated so that their respective piston rods 33 and 37 are extended, with end sections 7 and 9 pivoted away from center section 5 about their respective connections 11 and 13. When this happens, center section 5 and its associated grader assembly 23 are simultaneously raised above ground level which permits plane 1 to be towed to another location of use or storage. Lift cylinders 31 and 35 are in fluid communication with each other and receive actuation fluid pressure from a separate hydraulic power source, such as an hydraulic power supply carried by tow vehicle 19.

When it is desired to lower center section 5 and its associated grader assembly 23, lift cylinders 31 and 35 are relieved of hydraulic pressure so that their respective piston rods 33 and 37 are retracted therein. As noted in FIG. 2, the lowermost position of center section 5, and the corresponding distance between the lowermost edges of blades 25 and ground level can be set by extending or retracting a plurality of stop bolts 39 provided on center section 5. Bolts 39 may be of the type disclosed by the Whitlow U.S. Pat. No. 4,150,726.

First hydraulic system 29 is depicted in greater detail in FIG. 3 wherein an hydraulic line 41 provides fluid communication between a variable chamber 43 of lift cylinder 31 and a variable chamber 45 of lift cylinder 35. Chambers 43 and 45 are, respectively, defined by the displacement of corresponding pistons 47 and 49 connected to their associated piston rods 33 and 37. Piston 47 also defines an opposite second variable chamber 51 which receives pressurized hydraulic fluid from a power source 53 on tow vehicle 19 through an hydraulic line 55. Similarly, piston 49 in lift cylinder 35 defines an opposite second variable chamber 57 which may communicate with ambient atmosphere through a standard vent valve 59. A bypass hydraulic line 61 joins and provides fluid communication between lines 41 and 55 when a shutoff valve 63 disposed in line 61 is in an open position.

Supply of hydraulic fluid pressure to line 55 from power source 53 is controlled by a first handle 65 which operates the lift portion of a master control valve 67. The degree of fluid pressure sent through line 55 can be controlled by varying the position of handle 65. Power source 53 and valve 67 may be of any type well known in the art and deemed suitable for the practice of the present invention. For example, power source 53 may include a reservoir 69 from which pure hydraulic fluid is pumped from the lower portion thereof by a pump 71 to control valve 67 through a first line 73. Hydraulic fluid is returned to reservoir 69 through a second line 75. Power source 53 and valve 67 may also be of the types disclosed in the aforementioned Whitlow U.S. Pat. No. 4,150,726.

The operation of first hydraulic system 29 shall now be described with particular reference to FIGS. 2 and 3. When it is desired to raise center section 5, valve 63 is maintained in a closed position and pressurized fluid is sent from power source 53 to chamber 51 of lift cylinder 31. As piston 47 is displaced, fluid contained within chamber 43 is correspondingly pressurized and sent through line 41 to chamber 45 of lift cylinder 35. This causes a substantially equal displacement of piston 49 in lift cylinder 35. As is therefore apparent, piston rods 33 and 37 are correspondingly extended from their respective lift cylinders 31 and 35, thus pivoting end sections 7 and 9 away from center section 5 and causing the latter to raise upwardly to a desired height for travel. At this point, handle 65 is actuated to close off line 55 at control valve 67 so that center section 5 will be maintained in a raised position. Lowering of center section 5 is achieved in the reverse procedure whereby fluid pressure is removed from line 55 upon appropriate positioning of handle 65 and actuation of control valve 67. As seen in FIG. 2, the extent to which the lower edges of blades 25 can be brought downwardly with respect to ground level is controlled by the positions of stops 39. When adjustment of stops 39 has been completed, it is then necessary to precisely position piston rods 33 and 37 within their respective lift cylinders 31 and 35 so that end sections 7 and 9 firmly abut their corresponding stops 39. This difficulty arises from the inevitable unequal distribution of fluid displaced in lift cylinders 31 and 35. Equalization of fluid displacements is achieved by opening valve 63, so that fluid pressure from line 55 bypasses cylinder 31 and advances directly to cylinder 35 through bypass line 61 and line 41. This permits passage of fluid to or removal of fluid from cylinder 35 independently of cylinder 31. During actual operation of plane 1, end sections 7 and 9 are in rigid abutment against stops 39 and are not supported by fluid pressure through lift cylinders 31 and 35.

The steering of plane 1 is achieved through a second hydraulic system indicated generally at 77 in FIG. 3. Hydraulic system 77 is associated and operates in conjunction with tongue 21 and wheel assemblies 15 and 17. Alternatively, hydraulic system 77 may also operate from power source 53 upon selective engagement of the latter through a second handle 79 which operates the steering portion of control valve 67.

Wheel assembly 15 includes a front axle 81 provided with a pair of front wheels 83 rotatably supported at the ends thereof. Steering of wheels 83 is accomplished by the pivoting movement of tongue 21 in response to the turning direction of tow vehicle 19. Pivotal movement of tongue 21 is transmitted to wheels 83 through a front steering linkage 85 that is operatively connected to wheels 83 through a pair of front rotatable spindles 87. Similarly, rear wheel assembly 17 includes a rear axle 89 having a pair of wheels 91 journaled at the ends thereof. Steering of wheels 91 is accomplished through actuation of a rear steering linkage 93 which is operatively connected to wheels 91 through a pair of rear rotatable spindles 95.

Second hydraulic system 77 includes a fluid motor in the form of an active cylinder 97 which is pivotally connected to axle 81 through a bracket 99. A piston rod 101 is disposed within cylinder 97 and includes a displaceable piston 103 for defining a pair of variable chambers 105 and 107 on either side thereof. One end of rod 101 is pivotally connected to linkage 85 through a bracket 109 so that the pivoting of tongue 21 causes a corresponding retraction or extension of rod 101 with respect to cylinder 97.

A fluid motor in the form of a passive cylinder 111 is pivotally connected to axle 89 through a bracket 113. Cylinder 111 is provided with a piston rod 115 which carries a displaceable piston 117 for defining a pair of variable chambers 119 and 121 on either side thereof. One end of rod 115 is pivotally connected to linkage 93 through a bracket 123. Thus, extension or retraction of rod 115 will provide corresponding actuation of linkage 93 to steer in the corresponding direction.

Chamber 105 of active cylinder 97 communicates with chamber 121 of passive cylinder 111 through an hydraulic line 125. Likewise, chamber 107 of active cylinder 97 communicates with chamber 119 of passive cylinder 111 through an hydraulic line 127. Lines 125 and 127 communicates with each other through a first bypass line 129 having a conventional cross relief valve 131 disposed therein. Lines 125 and 127 may also communicate with each other adjacent their connections to passive cylinder 111 through a second bypass line 133 having a shutoff valve 135 disposed therein. The latter valve is preferably manually operated and permits communication between lines 125 and 127 when in an open position.

Line 125 may receive hydraulic fluid from or discharge hydraulic fluid to power source 53 through an hydraulic line 137. Similarly, line 127 may receive hydraulic fluid from or discharge hydraulic fluid to power source 53 through an hydraulic line 139. Passage of hydraulic fluid from power source 53 to and from lines 137 and 139 is controlled by valve 67 through three positions of handle 79. In a first position, fluid may be pumped from power source 53 to line 137 and receive fluid from line 139. In a second position, fluid communication between power source 53 and lines 137 and 139 are terminated or dead ended so that actuation of passive cylinder 111 is accomplished solely through actuation of active cylinder 97. In a third position, fluid from power source 53 is sent to line 139 and received from line 137.

When power source 53 is utilized to directly activate passive cylinder 111, active cylinder 97 effectively functions as a dead end terminal, with hydraulic pressure to passive cylinder 111 being received from power source 53 through either line 137 or line 139, depending on the direction in which it is desired to turn rear wheels 91. Any air entrapped in second hydraulic system 77 during the normal operation thereof is quickly removed by first opening shutoff valve 135, thereby bypassing passive cylinder 111 so that fluid contained in lines 125, 127, 137 and 139 will completely circulate therethrough to reservoir 69 of power source 53. The entrapped air is removed in reservoir 69 so that only pure hydraulic fluid is sent back into second hydraulic system 77. When all of the entrapped air has been removed, valve 135 is then closed to permit selective actuation of passive cylinder 111 by either active cylinder 97 or power source 53.

The details of grader assembly 23 shall now be described with reference to FIGS. 4–6. As particularly shown in FIG. 4, grader assembly 23 is carried on the lower portion of center section 5 by a bracket assembly 141 which may comprise a pair of parallel plates 43 with a pair of associated bolts 145 for attaching blade support 27 to center section 5. Bracket assembly 141 may be of any type well known in the art so long as it permits angular adjustment of blade 25 with respect to the longitudinal axis of frame 3. While only a single bracket assembly 141 is depicted in FIG. 4, it is understood that blade support 27 does extend past the other parallel side of center section 5 and is similarly secured to the latter by means of a second blade assembly 141. Grader assembly 23 thus comprises a plurality of blade supports 27 and their associated blades 25 secured at spaced points along the length of center section 5 and disposed at various desired angles with respect to the longitudinal axis of frame 3.

Blade support 27 includes a channel beam 147 having a plate 149 pivotally connected at its extremities through an axle 151. As seen in FIG. 5, each end of blade 25 is secured to its associated plate 149 through a bracket 153, the latter being of any conventional means known in the art and capable of rigidly securing blade 25 to plate 149. It is preferable that bracket 153 permit adjustment in positioning the lowermost edge of blade 25 either forwardly or rearwardly to set the best grading angle for any given ground condition. As further shown in FIGS. 4 and 5, rearward pivotal movement of the upper portion of plate 149 is limited to its contact by a stop 155 secured at the outer ends of beam 147. Thus, stop 155 limits the forward movement of blade 25 to its predetermined grading angle, but permits blade 25 to pivot or trip rearwardly in response to an applied force F, the tripping of blade 25 being controlled by a biasing mechanism 157.

As particularly shown in FIGS. 4 and 5, biasing mechanism 157 includes a resilient member 159, such as a coil spring, having one end secured to a flange 161 attached to blade support 27 and its other end secured to a linkage 163 through a turnbuckle 165 or other similar adjustment mechanism. Linkage 163 is preferably flexible and may comprise a chain. Alternatively, linkage 163 may include rigid members suitably joined together for performing the function required by biasing mechanism 157. The free end of linkage 163 is secured in a notched flange 167 carried at the upper end of plate 149 adjacent stop 155. A cam arm 169 is pivotally connected at one end to blade support 27 through a journal bearing unit 171 which may include a cylindrical housing 173 within which a rotatable sleeve 175 is journaled, with arm 169 being directly attached to sleeve 175. The free end of arm 169 includes a tab 177 provided with a notch 179 therein. Thus, arm 169 may either pivot outwardly in the direction designated by arrow A or inwardly in the direction designated by arrow B, with notch 179 receiving the portion of linkage 163 at the position in which it is desired to locate arm 169.

When an applied force is imparted to blade 25 in the direction of arrow F and this force exceeds the restoring force imparted by spring 159, blade 25 begins to pivot rearwardly about axle 151, thereby causing spring 159 to extend and swinging arm 169 outwardly in the direction of arrow A. The reverse occurs when the applied force F is removed and blade 25 is pulled back into position by the restoring force of spring 159 until plate 149 engages stop 155.

With particular attention to FIG. 6, it is seen that a center point is reached when the longitudinal axis of arm 169 is disposed substantially parallel with the direction of applied force F. At this point, angle C becomes zero and a maximum amount of applied force F is required to overcome the restoring force imparted by spring 159. If arm 169 is preset outwardly in direction of arrow A, the degree of restoring force imparted by spring 159 decreases with an increase in angle C. If arm 169 is pivoted inwardly in the direction of arrow B until angle C becomes less than zero, this sets arm 169 in an overcenter position in which blade 25 is locked rigidly against any possibility of tripping, regardless of the amount of applied force F.

It is improtant to note that when arm 169 is set in any position wherein angle C is greater than 0° but less than 45°, the applied force F required to initiate tripping of blade 25 is much greater than that required for continued tripping after arm 169 has swung outwardly in the direction of arrow A past the point when angle C equals 45°. This situation is highly advantageous for both protecting blade 25 against damage and yet still preventing constant tripping of blade 25 during normal operations. Because of this arrangement, the lowermost edge of blade 25 can be set at a greater forward position for more efficient grading action than has heretofore been possible with known means for biasing grader blades.

The restoring force imparted by biasing mechanism 157 is essentially established through positioning arm 169. However, such force may also be varied by adjusting turnbuckle 165 to extend or retract spring 159. In this manner, precise control of the desired restoring force can be established for blade protection and all anticipated operating conditions.

The foregoing is considered as only illustrative of the basic principle of the present invention since numerous modifications and changes will readily occur to those skilled in the art. It is therefore not desired to limit the invention to the exact construction and operation shown and described, but that all suitable modifications and equivalents may be resorted to and falling within the scope of the invention as hereinafter claimed.

I claim:

1. An improved land plane comprising:
   (a) a front section, a center section and a rear section, wherein the front and rear sections are pivotally connected to the center section for swinging movement about axes transverse to the longitudinal axis of the plane for raising and lowering the center section between a raised position and a lowered position;
   (b) contact means carried by the center section for engagement by the front and rear sections in the lowered position but spaced from both the front and rear sections in the raised position; and
   (c) a hydraulic lift system including:
   i. a first hydraulic fluid motor for imparting swinging movement to the front section;
   ii. a second hydraulic fluid motor for imparting swinging movement to the rear section;
   iii. a first hydraulic fluid line for providing fluid communication between the first and second motors;
   iv. a second hydraulic fluid line for supplying pressurized hydraulic fluid to the motors; and
   v. means for equalizing the displacement of hydraulic fluid between the motors and permitting both the front and rear sections to engage the contact means.

2. The land plane of claim 1 wherein:
   (a) the first fluid motor includes a first cylinder for attachment to the front section and a first piston rod having a free end for contact with the center section; and
   (b) the second fluid motor includes a second cylinder for attachment to the rear section and a second piston rod having a free end for contact with the center section.

3. The land plane of claim 2 wherein:
(a) the first cylinder includes a displaceable piston for defining a variable chamber on either side thereof; and
(b) the first hydraulic fluid line communicates with one of the variable chambers and the second hydraulic fluid line communicates with the other variable chamber.

4. The land plane of claim 2 wherein the second cylinder further includes:
(a) a displaceable piston for defining a variable chamber on either side thereof; and
(b) means for venting one of the chambers to the atmosphere.

5. The land plane of claim 1 wherein the means for equalizing the displacement of hydraulic fluid between the motors includes:
(a) a third hydraulic fluid line interconnecting the first and second hydraulic fluid lines; and
(b) a valve disposed in the third hydraulic fluid line for permitting the flow of hydraulic fluid between the first and second hydraulic fluid lines.

6. The land plane of claim 1 wherein the second hydraulic fluid line supplies pressurized hydraulic fluid to one of the fluid motors for actuating same whereby actuation of the one fluid motor causes a responsive actuation of the other fluid motor through the first hydraulic fluid line.

7. An improved land plane for connection to a tow vehicle and a pressurized hydraulic fluid source, which land plane comprises:
(a) a front wheel assembly and a rear wheel assembly;
(b) a pivotal tongue carried by the front wheel assembly for connecting the plane to a tow vehicle; and
(c) a hydraulic steering system including:
  i. a first hydraulic motor carried by the front wheel assembly for actuation by the pivotal tongue;
  ii. a second hydraulic fluid motor carried by the rear wheel assembly;
  iii. means for providing fluid communication between the first and second fluid motors for actuation of the second fluid motor in response to the actuation of the first fluid motor;
  iv. means for permitting independent actuation of the second fluid motor by the pressurized hydraulic fluid source; and
  v. means in fluid communication with the means for providing fluid communication between the first and second fluid motors for bypassing fluid flow to the second fluid motor to purge entrapped air from the steering system and directing the purged air back to the pressurized hydraulic fluid source to permit compensation for variations in steering between the front and rear wheel assemblies.

8. The land plane of claim 7 wherein:
(a) the means for providing fluid communication includes a pair of hydraulic fluid lines; and
(b) the means for purging entrapped air includes:
  i. a bypass line connecting the pair of fluid lines; and
  ii. a valve disposed in the bypass line for permitting circulation of fluid through the pair of lines and the pressurized hydraulic fluid source.

9. The steering system of claim 8 wherein the bypass line is disposed adjacent the second hydraulic fluid motor.

10. A pivotal grader blade having a biasing mechanism for imparting a restoring force in opposition to applied forces encountered during grading for controlled tripping of the blade and prevention of damage thereto, which biasing mechanism comprises:
(a) resilient means for imparting the restoring force; and
(b) means for transmitting the restoring force from the resilient means to the pivotal grader blade so as to require a greater degree of applied force for initiating tripping of the blade than that which is required for subsequent continued tripping of the blade, which transmitting means includes:
  i. a linkage; and
  ii. an elongate member having a free end for camming against the linkage at a desired point along the length thereof.

11. The pivotal grader blade of claim 10 wherein the means for imparting the restoring force includes a coil spring.

12. The pivotal grader blade of claim 10 wherein the linkage includes a flexible length of chain.

13. The pivotal grader blade of claim 12 wherein the free end of the elongate member includes a notched tab for engaging the chain.

14. The pivotal grader blade of claim 10 wherein maximum restoring force is realized when the elongate member is engaged with the linkage in a position whereby the longitudinal axis of the elongate member is substantially parallel to the direction of applied force, thereby defining a center point for the elongate member.

15. The pivotal grader blade of claim 14 wherein:
(a) when the elongate member is positioned beyond the center point on one side thereof the grader blade is blocked against tripping; and
(b) when the elongate member is positioned beyond the center point on the other side thereof, the degree of restoring force increases with the increase of angle defined by the longitudinal axis of the elongate member so positioned and its longitudinal axis at the center point.

16. The pivotal grader blade of claim 15 wherein the greater degree of applied force required for initiating tripping occurs when the angle is less than 45° and the lesser degree of applied force required for subsequent continued tripping occurs when the angle exceeds 45°.

* * * * *